(12) United States Patent
Collier

(10) Patent No.: US 6,929,528 B2
(45) Date of Patent: Aug. 16, 2005

(54) WILD GAME CALL

(76) Inventor: Edwin Collier, 19 E. Main St., Elizabethville, PA (US) 17023

( * ) Notice: Subject to any disclaimer, the term of this patent is extended or adjusted under 35 U.S.C. 154(b) by 0 days.

(21) Appl. No.: 10/668,471

(22) Filed: Sep. 23, 2003

(65) Prior Publication Data

US 2005/0064784 A1 Mar. 24, 2005

(51) Int. Cl.$^7$ .................................................. A63H 5/00
(52) U.S. Cl. ........................................ 446/418; 446/397
(58) Field of Search ................................ 446/418, 397

(56) References Cited

U.S. PATENT DOCUMENTS

| | | | | |
|---|---|---|---|---|
| 2,511,403 A | * | 6/1950 | Fleener | 446/397 |
| 3,100,948 A | * | 8/1963 | Tax | 446/397 |
| 4,343,108 A | * | 8/1982 | Lee | 446/397 |
| 4,422,262 A | * | 12/1983 | Moss | 446/397 |
| 4,606,733 A | | 8/1986 | Willis | |
| 4,648,852 A | | 3/1987 | Wingate | |
| 4,662,858 A | | 5/1987 | Hall | |
| 4,664,641 A | * | 5/1987 | Hearn et al. | 446/397 |
| 4,846,753 A | * | 7/1989 | Langston | 446/397 |
| 4,904,221 A | | 2/1990 | Taylor | |
| 4,932,920 A | * | 6/1990 | Hearn | 446/397 |
| 4,941,858 A | * | 7/1990 | Adams | 446/397 |
| 4,988,325 A | | 1/1991 | Alderson et al. | |
| 5,178,575 A | | 1/1993 | Koch | |
| 5,380,235 A | * | 1/1995 | Forbes et al. | 446/397 |
| 5,484,319 A | * | 1/1996 | Battey | 446/397 |
| 5,830,036 A | * | 11/1998 | Richardson | 446/397 |
| 5,846,119 A | * | 12/1998 | Long | 446/397 |
| 5,921,842 A | * | 7/1999 | Allenby | 446/397 |
| 6,095,888 A | * | 8/2000 | Panepinto | 446/397 |
| 6,149,493 A | * | 11/2000 | Long | 446/397 |
| 6,168,493 B1 | * | 1/2001 | Kirby | 446/418 |
| 6,669,528 B2 | * | 12/2003 | Kaelin | 446/397 |
| 2003/0114073 A1 | * | 6/2003 | Kaelin, II | 446/200 |

* cited by examiner

*Primary Examiner*—Derris H. Banks
*Assistant Examiner*—Ali Abdelwahed
(74) *Attorney, Agent, or Firm*—McNees Wallace & Nurick LLC

(57) ABSTRACT

A wild game call of the box and striking plate variety is provided that can easily produce superior sound variety, sound quality, and volume control with minimal user input. The invention comprises a box with a base portion and substantially vertical sidewalls, which form an opening, and a striking plate, which provides a striking surface, and a bottom surface. The striking plate further includes a main body portion, which is adhered to the sidewalls to form the top of the box, and a protruding portion adjacent the opening, which extends over and beyond the opening. The striking plate provides a striking surface, which may be comprised of a single material, or of multiple friction materials. Hollow structures such as channels and grooves are also provided to alter the sound of the call.

20 Claims, 13 Drawing Sheets

WILD GAME CALL

FIELD OF THE INVENTION

The present invention relates generally to a wild game call, and more particularly to game calls of the box and striker type.

BACKGROUND OF THE INVENTION

Many types of wild game calls are available on the market. Calls of the box and striker type generally include a striking plate made of slate, glass, or other material, which striking plate provides a striking surface. The striking plate is mounted on a box. A striker is provided, which may be handheld or pivotally attached so that the striker can be easily moved across the striking surface to generate a desired sound. Calls utilizing a box and striker are very popular among hunters because they provide the advantage of allowing the user to widely vary the sound of the call. For example, hunters can vary the sound generated by a particular call through selection of the composition, friction coefficient, and shape of the handheld striker. Additionally, different sounds can be generated by varying the movement and duration of contact of the handheld striker in relation to the striking surface.

However, the sound quality and variety of known calls is limited by the structure of known striking plates and box configurations. In all known boxes, the striking plate is coexistent with the box. In other words, as described in U.S. Pat. No. 4,648,852, the extension of the striking plate is defined by an area equal to and positioned in vertically overlying alignment with the vertical interior walls of the box or sound chamber. This limits the quality, volume, and variety of sounds, which can be produced by the user.

Additionally, in all known calls, the striking plate is comprised of a solid homogeneous piece or pieces of frictional material such as glass, slate, weather resistant thermoplastic, such as PLEXIGLAS® thermoplastic, or wood. PLEXIGLAS® is a registered trademark of Atofina, a French corporation based in Puteaux France. Thus, known striking plates are very rigid, and possess very limited resonance properties. These properties further limit the quality, volume, and variety of sounds, which can be produced by the user.

In light of the prior art, it would be beneficial to provide a wild game call of the box and striking plate variety that overcomes the deficiencies of the prior art. In particular, there is a continuing need for wild game calls that can easily produce superior sound variety, sound quality, and volume control with minimal user input.

SUMMARY OF THE INVENTION

The present invention provides a wild game call of the box and striking plate variety that can easily produce superior sound variety, sound quality, and volume control with minimal user input. The invention is directed to a novel wild game call having a box with a base portion and substantially vertical sidewalls, which form an opening. The call further includes a striking plate which provides a top surface and an opposite bottom surface. The striking plate further comprises a main body portion, having a top surface and a bottom surface, which is adhered to the sidewalls to form the top of the box, and a protruding portion, having a top surface and a bottom surface, adjacent the opening which extends over and beyond the opening. Both the top surface of the main body portion and the top surface of the protruding portion function as a top striking surface, while only the bottom surface of the protruding portion functions as a striking surface. Strikers, which are well known in the art, are used in conjunction with the top striking surface and/or the bottom striking surface of the present invention to make the sound of wild game as known in the art. Such strikers may be of any known type and composition known to those skilled in the art, including but not limited to friction materials such as stone, glass, plastic, and metals.

Under normal circumstances, rain often interferes with the use of wild game calls. If it is raining, the game call of the present invention will still function well as the bottom striking surface, which extends over and beyond the opening of the box, can be struck without exposing the striker to the rain.

During operation, the quality, tone, and volume of the game call can be varied by striking a striking surface, while closing the opening of the call, such as, for example, by placing a finger over the opening of the call.

In other embodiments, the striking plate incorporates additional features to produce varied sound quality and volume. For example, the plate may have varying thickness, or may incorporate hollow or grooved structures that alter the sound of the call. Additionally, the plate may be comprised of a single friction material, or may combine several different friction materials in a single embodiment. Where several different function materials are provided, the user can produce a wider variety of different sounds on the same call.

An advantage of the present invention is that the call can readily be used in the rain since a portion of the bottom surface of the striking plate is a striking surface.

Another advantage of the present invention is that numerous different types of materials can be used as striking surfaces, which varies the quality and tone of the call.

Another advantage of the present invention is that grooves and/or hollow tubes can be present in the striking surface, which varies the quality and tone of the call.

Another advantage of the present invention is that different types of materials can be layered together to form the striking plate, which varies the quality and tone of the call.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The invention will be further understood from the following description and drawings which shows various embodiments of the present invention, wherein.

Wherever possible, the same reference numbers will be used throughout the drawings to refer to the same or like parts.

BRIEF DESCRIPTION OF THE PREFERRED EMBODIMENTS

Figure 1:
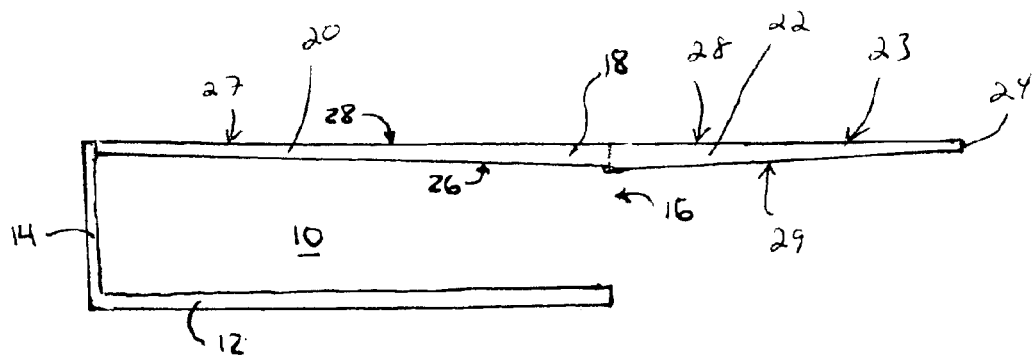
FIG. 1 is a side cross-sectional view of an embodiment of the wild game call of the present invention, which illustrates the striking plate mounted on the box, wherein the striking plate does not extend over the sidewalls of the box.
Figure 2:
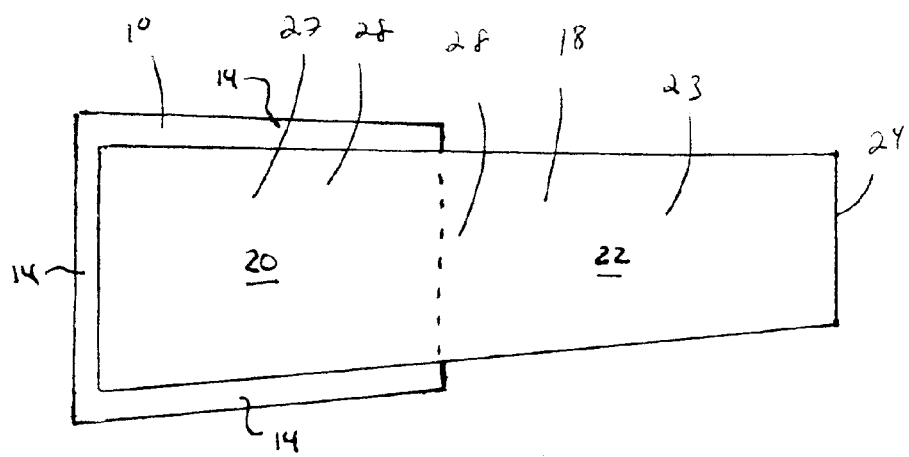
FIG. 2 is a top view of the wild game call of FIG. 1, wherein the sidewalls of the box are generally rectangular.
Figure 3:
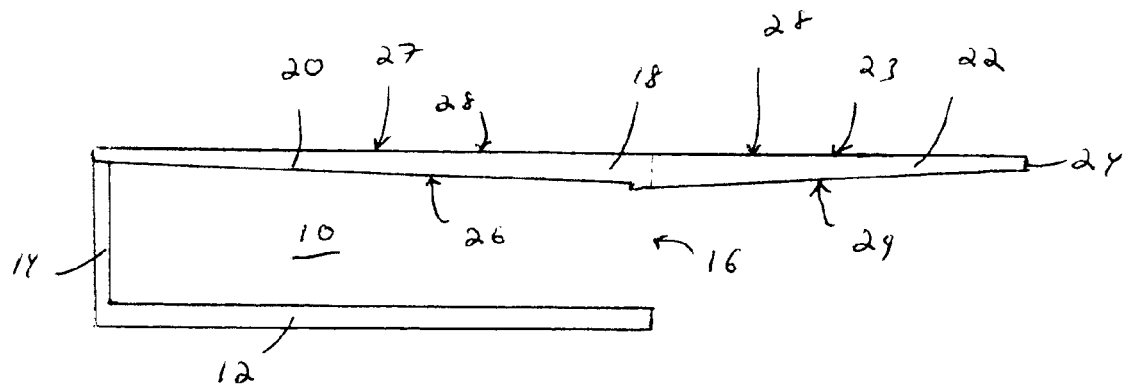
FIG. 3 is a side cross-sectional view of an embodiment of the wild game call of the present invention, which illustrates the striking plate mounted on the box, wherein the striking plate extends over the sidewalls of the box.
Figure 4:
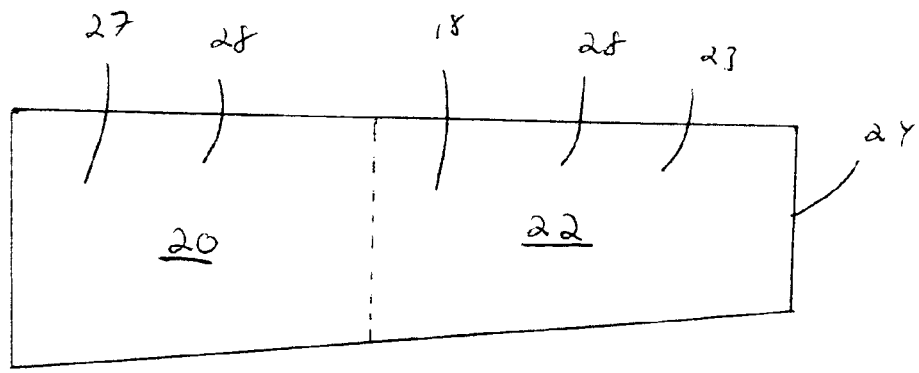
FIG. 4 is a top view of the wild game call of FIG. 3, wherein the sidewalls of the box are generally rectangular.
Figure 5:
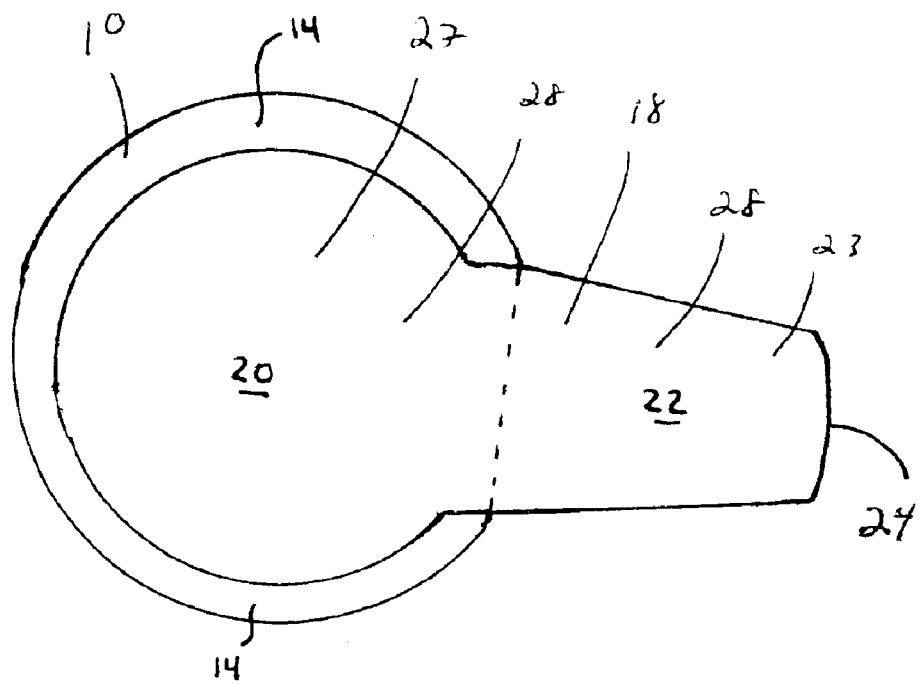
FIG. 5 is a top view of another embodiment of the wild game call of the present invention, wherein the box has generally circular sidewalls, wherein the striking plate does not extend over the sidewalls of the box.
Figure 6:
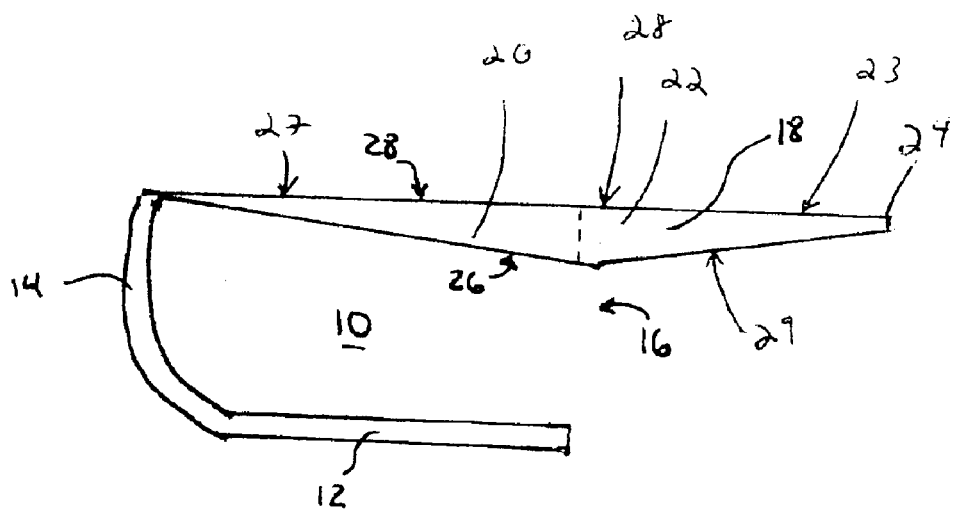
FIG. 6 is a side cross-sectional view of the wild game call of FIG. 5.
Figure 7:
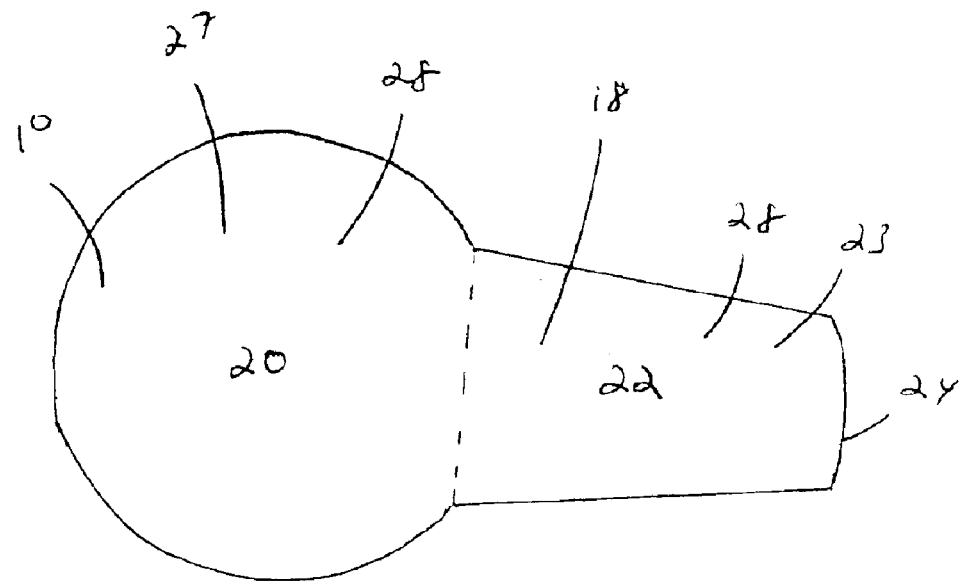
FIG. 7 is a top view of another embodiment of the wild game call of the present invention, wherein the box has generally circular sidewalls, wherein the striking plate extends over the sidewalls of the box.
Figure 8:
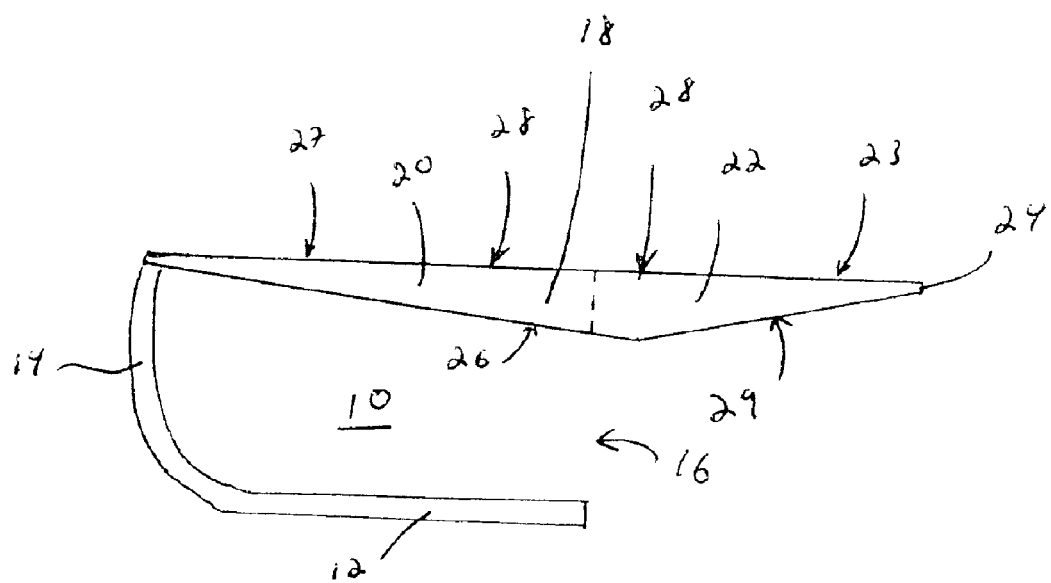
FIG. 8 is a side cross-sectional view of the wild game call of FIG. 7.

As shown in FIG. 1 and FIG. 2, the two primary elements of the call are a box 10 having a closed base 12 and generally vertical sidewalls 14, an opening 16 in the sidewall, and a striking plate 18, comprising at least one friction surface, that serves as the top wall of the box. Strikers (not shown) used in conjunction with the present invention may be of any known type and composition known to those skilled in the art, including but not limited to friction materials such as stone, glass, plastic, and metals. The call is sized so that it can easily be held and operated by a person. The call will generally be larger for adults and smaller for children.

The box 10 may be of any rigid material having resonant properties, including but not limited to wood, plastic, metal, and the like. The base 12 and sidewalls 14 of the box 10 may be varied in geometry, size, contiguity, and shape to form a volumetric chamber. The volumetric chamber may be comprised of any number of geometries, including semi-circular, square, triangular, rectangular, rectangular with rounded corners, cylindrical, or trapezoidal, provided that the box 10 generally has a base 12 and generally vertical sidewalls 14 with at least one opening 16 in the sidewall. In an alternative embodiment, due to the geometric configuration of the box, the entire volumetric chamber is enclosed by a single sidewall 14. Preferably, the opening 16 extends the entire height of the sidewall 14 as shown in FIG. 1. The size and shape of the opening may be varied in different embodiments so as to create differing volume and resonance qualities of the box 10, thus affecting the sound produced by the call. The thicker the base 12 of the box 10, the sound will be dampened and will not project as far as a thinner base 12. Altering the thickness of the base 12 of the box 10 will also alter the quality and/or tone of the sound. Altering the length of the box will also alter the volume, quality, and/or tone of the sound.

In addition to altering the length of the box 10 or altering the thickness of the base 12 of the box 10, the quality and/or volume of the sound of the game call of the present invention can also be adjusted by placing a dampening object against the base 12 of the box 10. For example, a hunter using the wild game call of the present invention can place his or her finger against the base 12 of the box, 10 while using the wild game call to alter the quality and/or volume of the sound of the game call.

The geometry of the striking plate 18 is such that the main body 20 of the striking plate 18 serves as the top of the box 10. The geometry, size, and volume of the striking plate can be varied to accomplish differing sounds. In any embodiment, the main body 20 of the striking plate 18 has a top surface 28 and a bottom surface 26. The striking plate 18 may or may not extend over the closed sidewalls 14 of the box 10. FIG. 1, FIG. 2, FIG. 5, FIG. 6, FIG. 9, FIG. 10, FIG. 14, FIG. 15, FIG. 18, and FIG. 20 show embodiments where the striking plate does not extend over the closed sidewalls 14 of the box 10. FIG. 3, FIG. 4, FIG. 7, FIG. 8, FIG. 11, FIG. 12, FIG. 13, and FIG. 16 show embodiments where the striking plate does not extend over the closed sidewalls 14 of the box 10. The geometry of the main body 20 of the striking plate 18 is therefore generally coexistent with the geometry created by the sidewalls 14 of the box and with the geometry of the base 12. The striking plate 20 is further comprised of a protruding portion 22, having a top surface 23 and a bottom surface 29, which is adjacent the opening 16 and which extends over and beyond the opening 16 in the sidewall 14 and which is therefore not coexistent with the sidewalls. The division between the main body 20 and the protruding portion 22 of the striking plate 18 is represented by a dotted line in the figures.

Figure 9:
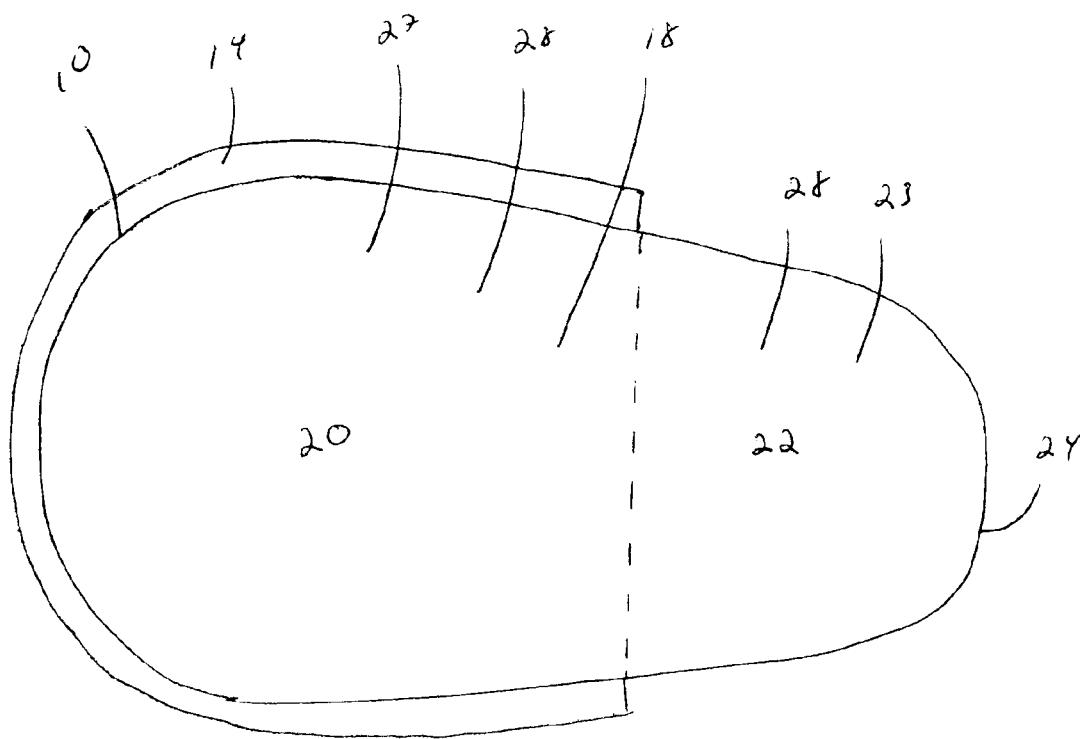
FIG. 9 is a top view of another embodiment of the wild game call of the present invention, wherein the box has generally rectangular sidewalls with rounded corners, wherein the protruding portion of the striking plate is generally rectangular with rounded corners, and wherein the striking plate does not extend over the sidewalls of the box.

The geometry of the protruding portion 22 may or may not be of the same general geometry as the main body 20 of the striking plate 18. The horizontal cross-sectional geometry of both the main body 20 and the protruding portion 22 may be of any number of geometries, including semicircular, square, triangular, rectangular, rectangular with rounded corners, trapezoidal, or trapezoidal with rounded corners. A generally trapezoidal main body 20 and protruding portion 22 are shown in the embodiment shown in FIG. 1 and FIG. 2 and in the embodiment shown in FIG. 3 and FIG. 4. A generally round main body 20 and a generally trapezoidal protruding portion 22 are shown in the embodiments shown in FIG. 4. and FIG. 5 and the embodiment shown in FIG. 6 and FIG. 7. A generally trapezoidal main body 20 having rounded corners and a generally trapezoidal protruding portion 22 having rounded corners is shown in FIG. 9. The striking plate 18 may be sealed to the box 10 by any known means, including but not limited to the use of adherents such as silicon adhesive, epoxy, and/or contact cement. Preferably, the adherent is waterproof so as to ensure a durable seal between the sidewalls 14 and the striking plate 18.

The striking plate 18 has two striking surfaces. The first striking surface is the top striking surface 28 of the striking plate 18, which comprises the top surface 27 of the main body 20 of the striking plate 18 and the top surface 23 of the protruding portion 22 of the striking plate 18. The second striking surface is the bottom striking surface 29, which comprises the bottom surface of the protruding portion 22 of the striking plate 18. The bottom surface 26 of the main body 20 of the striking plate 18 does not function as a striking surface.

The thickness of the striking plate 18 may vary over the length of the plate 18 to permit generation of differing sounds across the plate 18, even with consistent use of the striker. For example, as shown in FIG. 1, FIG. 3, FIG. 6, FIG. 8, FIG. 11, FIG. 12, FIG. 15, FIG. 16, and FIG. 20, a thicker portion of the plate 18 may extend over the opening 16, and the thickness of the protruding portion 22 may narrow gradually to form a thin unsecured end 24 that can be used to differing pitch sounds. Preferably, the geometry of plate 18 and thin unsecured end 24 are such that no secondary vibration occurs in the thin unsecured end 24. Such secondary vibration could reduce the quality of the sound produced by the wild game call of the present invention. Additionally, the thickness of the main body 20 may comprise a tapered portion as shown in FIG. 1, FIG. 3, FIG. 6, FIG. 8, FIG. 11, FIG. 12, FIG. 15, FIG. 16, and FIG. 20. The sidewalls 14 may be thicker or thinner than the base 12 and/or the striking plate 18 depending on the sound desired by the user of the wild game call. Likewise, the striking plate 18 may be thicker or thinner than the base 12 and/or the sidewalls 14 depending on the sound desired by the user of the wild game call. In one embodiment, shown in FIG. 20, the base 12 is about twice as thick as the sidewalls 14.

Figure 10:
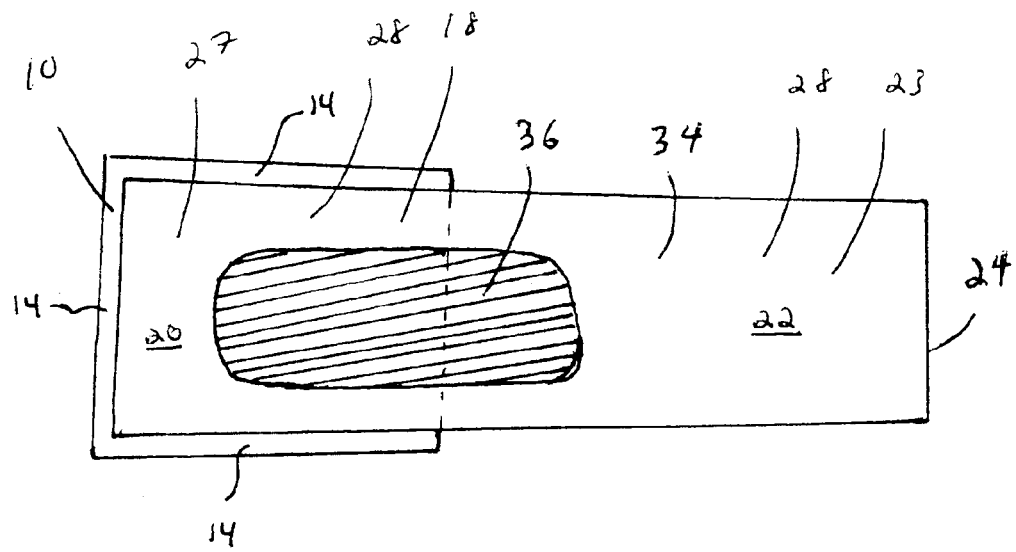
FIG. 10 is a top view of another embodiment of wild game call of the present invention, and illustrates a striking plate comprised of two different friction materials arranged so that at least two different striking surfaces are provided on the top striking surface.
Figure 18:
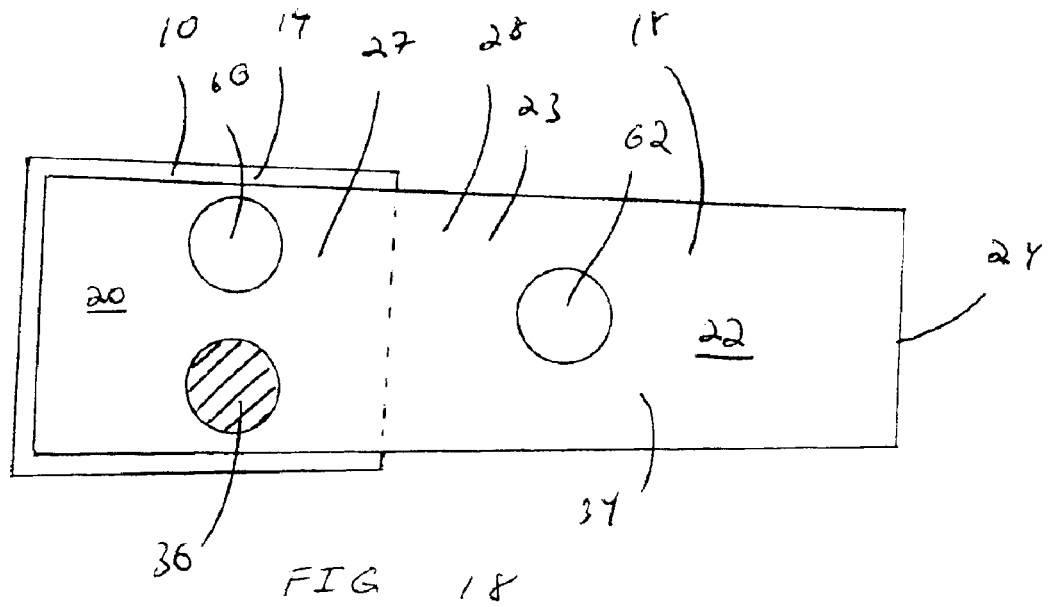
FIG. 18 is a top view of another embodiment of wild game call of the present invention, and illustrates a striking plate comprised of two different friction materials arranged so that four different striking surfaces are provided on the top striking surface.

The striking plate 18 may be of any known composition for striking plates, including, but not limited to, frictional materials such as glass, weather resistant thermoplastic, slate, stone, wood, metals, and plastics. As used herein the term "slate" includes both the naturally occurring stone and composite materials comprising a mixture of epoxy and at least one of stone, sand, cat litter, and combinations thereof. Additionally, the striking plate 18 may comprise multiple materials in multiple configurations. For plates 18 comprising multiple materials, numerous arrangements and configurations are contemplated herein, such as embedding portions of material within the plate 18, where the embedded materials are comprised of different materials than the plate 18. As shown in FIG. 10 and FIG. 18 different embedded striking materials are embedded such that there are a plurality of striking materials in the top striking surface 28 of the plate 18. In FIG. 10, a first striking material 34 comprising a first portion of the plate 18 and a second striking material 36 comprising a second, remaining portion of the plate 18 can be seen. The first striking material 34 comprises one type of material, such as, for example, slate, and the second striking material 36 comprises a second type of material, such as, for example, aluminum. In FIG. 18, a first striking material 34 comprises a first portion of the plate 18, a second striking material 36 comprises a second portion of the plate 18, a third striking material 60 comprises a third portion of the plate 18, and a fourth striking material 62 comprises a fourth portion of the plate 18. The first striking material 34 comprises one type of material, such as, for example, slate, the second striking material 36 comprises a second type of material, such as, for example, slate, the third striking material 60 comprises a third type of material, such as, for example, glass, and the fourth striking material 62 comprises a fourth type of material, such as, for example, plastic.

Figure 17:
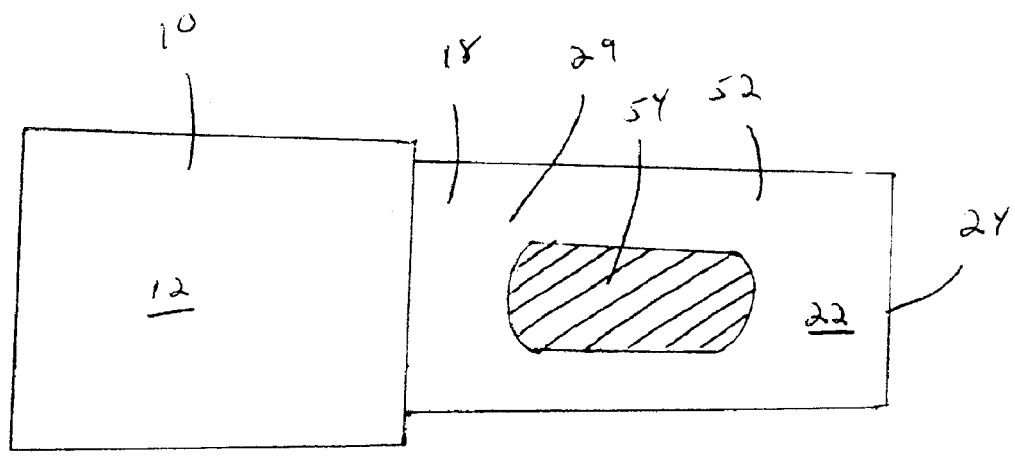
FIG. 17 is a top view of another embodiment of wild game call of the present invention, and illustrates a striking plate comprised of two different friction materials arranged so that two different striking surfaces are provided on the bottom striking surface.
Figure 19:
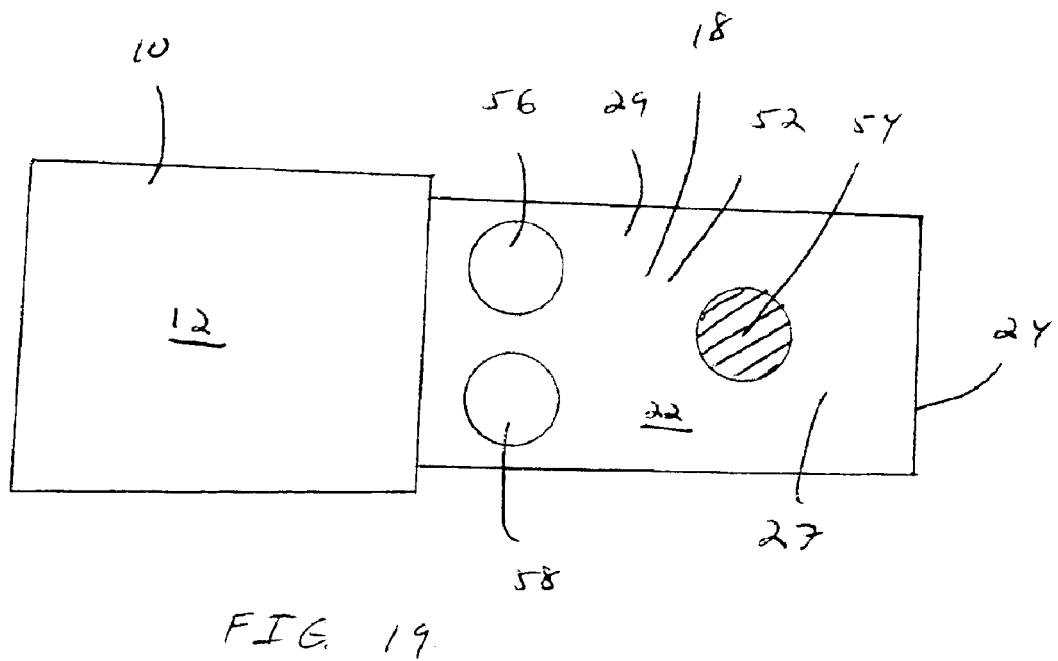
FIG. 19 is a bottom view of another embodiment of wild game call of the present invention, and illustrates a striking plate comprised of four different friction materials arranged so that four different striking surfaces are provided on the bottom striking surface.
Figure 20:
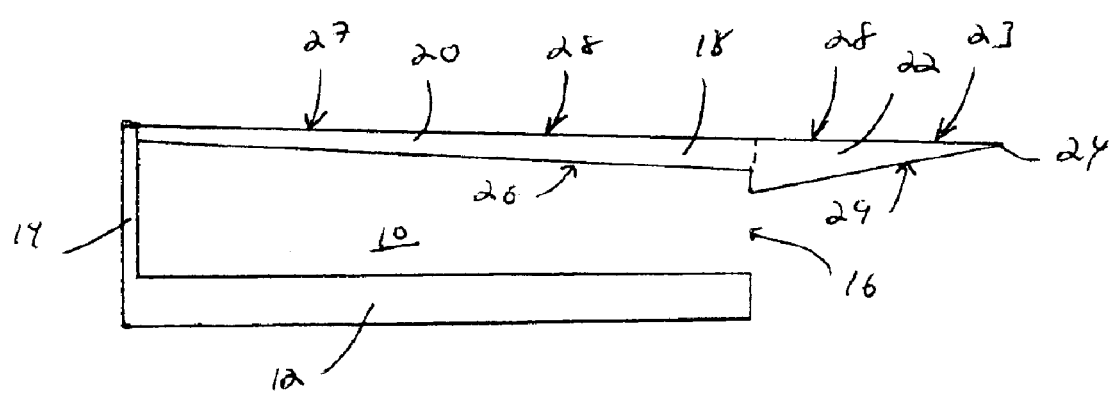
FIG. 20 is a side cross-sectional view of an embodiment of the wild game call of the present invention, and illustrates a box base that is substantially thicker than the sidewalls of the box.

As shown in FIG. 17 and FIG. 19 different embedded striking materials are embedded such that there are a plurality of striking materials in the bottom striking surface 29 of the plate 18. In FIG. 17, a first striking material 52 comprises a first portion of the plate 18 and a second striking material 54 comprises a second, remaining portion of the plate 18. The first striking material 52 comprises one type of material, such as, for example, slate, and the second striking material 54 comprises a second type of material, such as, for example, aluminum. In FIG. 19, a first striking material 52 comprises a first portion of the plate 18, a second striking material 54 comprises a second portion of the plate 18, a third striking material 56 comprises a third portion of the plate 18, and a fourth striking material 58 comprises a fourth portion of the plate 18. The first striking material 52 comprises one type of material, such as, for example, slate, the second striking material 54 comprises a second type of material, such as, for example, aluminum, the third striking material 56 comprises a third type of material, such as, for example, glass, and the fourth striking material 58 comprises a fourth type of material, such as, for example, plastic. In addition, metal, such as galvanized steel, sand, weather resistant thermoplastic, and combinations thereof may be embedded in the plate 18 to effect the quality of the sound of the wild game call of the present invention. Such metal, sand, weather resistant thermoplastic, and combinations thereof may be embedded such that no metal, sand, weather resistant thermoplastic, and combinations thereof are exposed, but rather are completely encapsulated within the slate.

Figure 11:
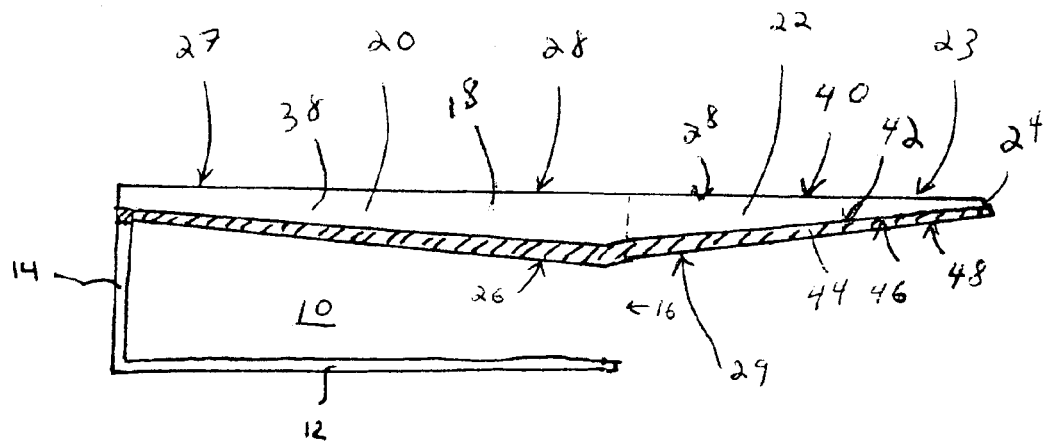
FIG. 11 is a side cross-sectional view of another embodiment of the wild game call of the present invention, wherein the striking plate is comprised of two different friction materials, one friction material being positioned above the second friction material, so that the material used for the bottom striking surface is different from the top striking surface.
Figure 12:
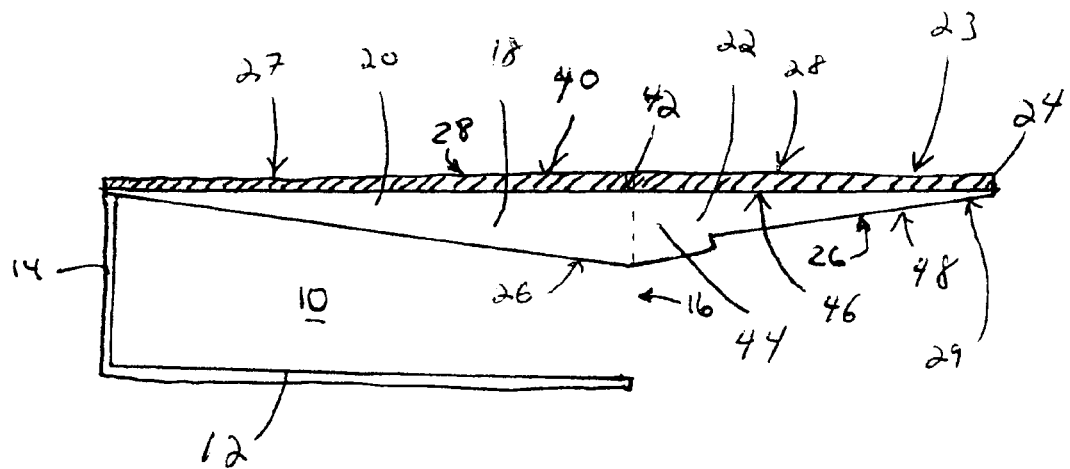
FIG. 12 is a side cross-sectional view of yet another embodiment of the wild game call of the present invention, which illustrates a striking plate comprising another configuration where two different friction materials arranged so that the material used for the bottom striking surface is different from the top striking surface.

In other embodiments, shown in FIG. 11, FIG. 12, FIG. 15, and FIG. 16, the striking plate 18 comprises an upper section 38 comprising of one material and a lower section 42 comprising a second material. The upper section 38 comprises a top surface 40, which functions as the top striking surface 28 and a bottom surface 42. The lower section 44 comprises a top surface 46 and a bottom surface 48, which is also the bottom surface 26 of the plate 18. The bottom striking surface 29 only comprises the bottom surface of the protruding portion 22. The bottom surface 42 of the upper section 38 is adhered to the top surface 46 of the lower section 44. In FIG. 11, the upper section 38 of the plate 18 comprises slate, while the lower section 42 comprises aluminum. In FIG. 12, upper section 38 of the plate 18 comprises aluminum, while the lower section 42 comprises slate. The upper section 38 and lower section 44 may be of any appropriate geometric shape. In yet another example, the striking plate 18 may comprise a metal, wood, slate, glass, and/or plastic overlay on a base comprising another material, such as metal, wood, slate, glass, and/or plastic, which may cover the entire plate 18, or may be limited to a portion of the plate 18. Such an overlay may be accomplished by pre-forming of the metal, glass, and/or plastic, which can then be applied by adherent or non-adherent means, depending upon the desired sound and resonance. The overlay may or may not be embedded within the striking plate 18, such that the top striking surface 28 is substantially planar. Adherent materials may be any known to those skilled in the art, including but not limited to non-sound insulating adherents such as thin set contact cement, or sound-insulating adherents such as thick silicone adhesive caulk. In an alternative embodiment shown in FIG. 15, at least a portion of the lower section 44 of the plate 18 comprises strips of wood having a thickness in the range of about ⅛" to about 1/16" inch that are unitary with at least one sidewall 14 of the box 10. The strips of wood comprise the lower section 44 of the plate 18. The strips of wood may be disposed adjacent to one another or spaced apart from one another. Composite slate material forms the upper section 38 of the plate 18.

Figure 16:
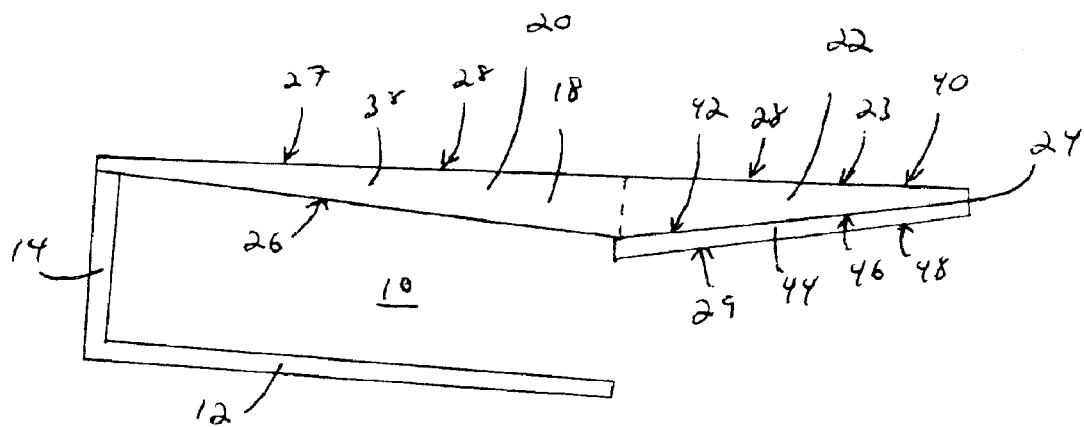
FIG. 16 is a side cross-sectional view of yet another embodiment of the wild game call of the present invention which illustrates a striking plate comprising another configuration where two different friction materials arranged so that the material used for the bottom striking surface is different from the top striking surface, and wherein the bottom friction material does not extend into the box.

In several embodiments, as shown in FIG. 11, FIG. 12, FIG. 15, FIG. 16, FIG. 17, and FIG. 19, at least a portion of the bottom striking surface 29 may comprise a different striking material than the top striking surface 28 of the striking plate 18. For example, the striking plate 18 may comprise a metal, wood, slate, glass, and/or plastic overlay on the bottom striking surface 29 comprising another material, such as metal, wood, slate, glass, and/or plastic. As shown in FIG. 16, the striking plate may comprise an upper section 38 and a lower section 44, where the lower section 44 is only present on the protruding portion 22. The bottom surface 42 of the upper section 38 is adhered to the top surface 46 of the lower section 44. In FIG. 11, the upper section 38 of the plate 18 comprises aluminum, while the lower section 42 comprises slate. As set forth above, the upper section 38 and lower section 44 may be of any appropriate geometric shape. In yet another example, as shown in FIG. 17, the striking plate 18 may comprise a metal, wood, slate, glass, and/or plastic overlay on the bottom striking surface 29 comprising another material, such as metal, wood, slate, glass, and/or plastic. In FIG. 17, this overlay is plastic. Such an overlay may be accomplished by pre-forming of the metal, wood, slate, glass, and/or plastic, which can then be applied by adherent or non-adherent means, depending upon the desired sound and resonance. The overlay may or may not be embedded within the striking plate 18, such that the bottom striking surface 29 is substantially planar. Adherent materials may be any known to those skilled in the art, including but not limited to non-sound insulating adherents such as thin set contact cement, or sound-insulating adherents such as thick silicone adhesive caulk.

In yet another embodiment, the striking plate 18 may comprise a metal, slate, glass, and/or plastic overlay on the bottom striking surface 29 and on the top striking surface 28 comprising another material, such as metal, slate, glass, and/or plastic. Such an overlay may be accomplished by pre-forming of the metal, slate, glass, and/or plastic, which can then be applied by adherent or non-adherent means, depending upon the desired sound and resonance. The overlay may or may not be embedded within the striking plate 18, such that the bottom striking surface 29 and top striking surface 28 are substantially planar. Adherent materials may be any known to those skilled in the art, including but not limited to non-sound insulating adherents such as thin set contact cement, or sound-insulating adherents such as thick silicone adhesive caulk.

Figure 13:
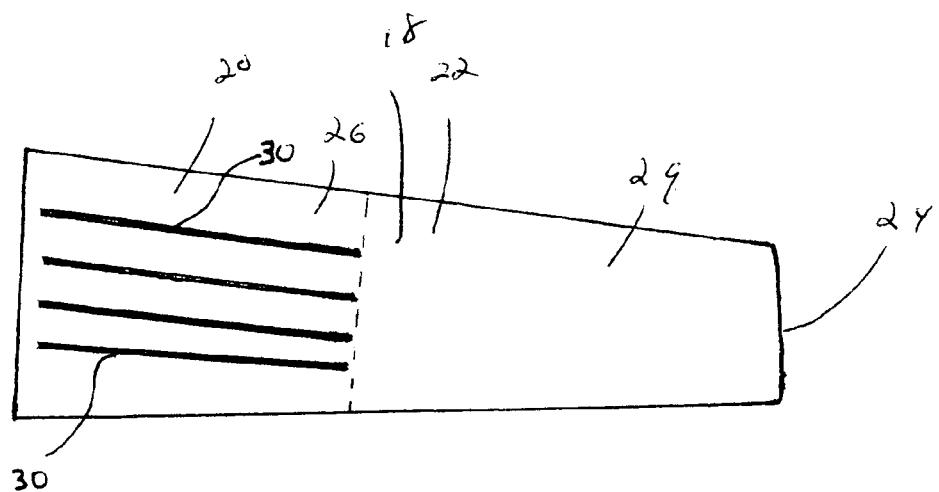
FIG. 13 is a bottom view of a striking plate of the wild game call of the present invention showing grooves in the bottom surface of the striking plate.

In other embodiments, the striking plate 18 incorporates hollow or grooved structures that alter the resonance and sound quality. For example, as shown in FIG. 13, the striking plate 18 contains grooves 30 in the bottom surface 26 opposite the striking surface 28 to produce varying thickness along the plate 18, which results in varying resonances throughout the striking plate 18. The grooves 30 may be rectangular, v-shaped, and/or rounded, and may extend along a any portion of the plate 18, such as a portion of or the entire the main body 20 as shown in or a portion of or the entire protruding portion 22. As shown in FIG. 13, the grooves are present in the entire main body 20, but not present in the protruding portion 22. Alternatively, the grooves may extend through the entire length of the striking plate 18 from the main body 20 through the protruding portion 22.

Figure 14:
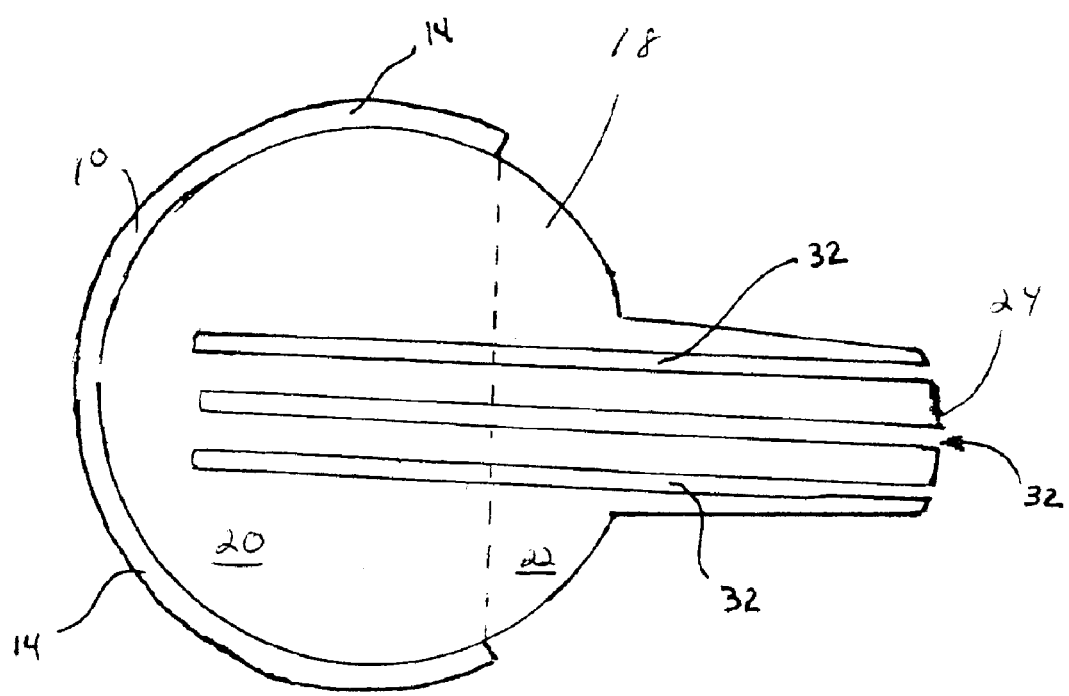
FIG. 14 is a top cross-sectional view of a striking plate of the wild game call of the present invention showing hollow structures in the form of enclosed channels formed in the striking plate.
Figure 15:
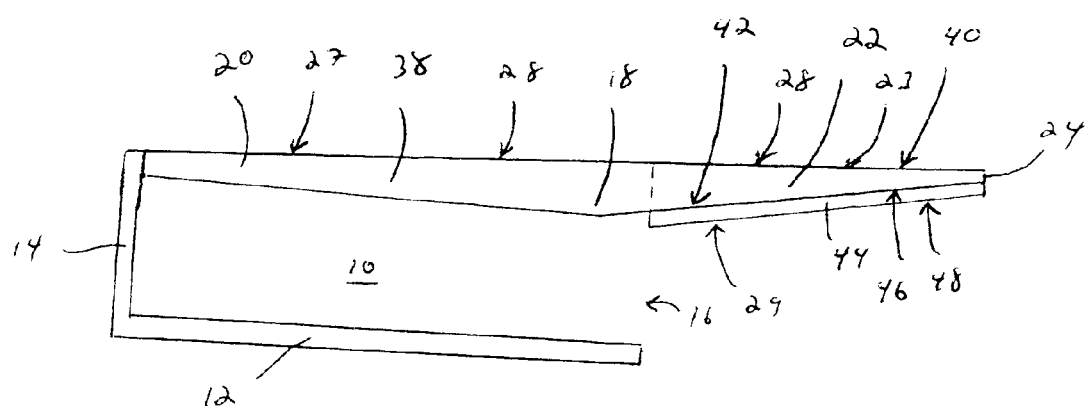
FIG. 15 is a side cross-sectional view of yet another embodiment of the wild game call of the present invention, which illustrates a striking plate comprising another configuration where at least a portion of the bottom striking surface comprises thin pieces of wood so that the material used for the bottom striking surface is different from the top striking surface.

In other embodiments, the striking plate 18 may incorporate tubes or channels 32 enclosed within the striking plate 18. Such For example, as shown in FIG. 14, the striking plate 18 may contain one or more enclosed channels 32 to produce varying thickness along the play 18, which results in varying resonances throughout the striking plate 18. The channels 32 may be any shape, including but not limited to triangular prisms, rectangular prisms, and/or cylinders, and may extend along any portion of the plate 18, such as a portion of or the entire main body 20 as shown in FIG. 14, or a portion of or the entire protruding portion 22. Alternatively, the channels 32 may extend throughout the entire length of the striking plate 18 from the main body 20 through the protruding portion 22. Channels 32 may be closed on both ends, or may protrude through the unsecured end 24, bottom surface 26, top, or sides of the plate 18 so that one or both ends of the channel are open. Channels 32 may be hollow, or may be filled or partially filled with different materials to alter the sound quality. For example, channels 32 may be filled with epoxy soaked stiff cardboard strips.

The grooves 30 or channels 32 may be formed during manufacture, such as by injection molding, or may be created during post-formation processing such as by routing or drilling. The grooves 30 or channels 32 may be present in any of the previously mentioned embodiments of the present invention. Such hollow, semi-hollow, or filled structures may extend part of the length or the entire length of the striking plate, or in any combination thereof. Additionally, grooves and channels of varying numbers, sizes, and geometries may be combined to produce different sounds.

Figure 21:
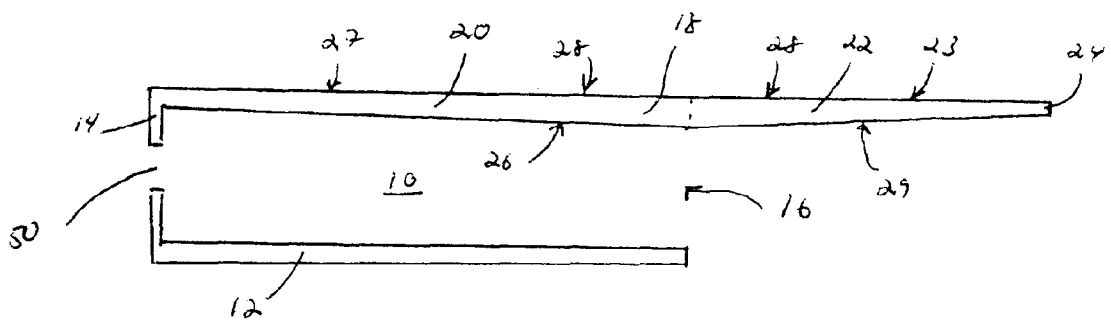
FIG. 21 is a side cross-sectional view of an embodiment of the wild game call of the present invention, which illustrates the striking plate mounted on the box, wherein the striking plate does not extend over the sidewalls of the box, and wherein there is an aperture in the sidewall of the box.
Figure 22:
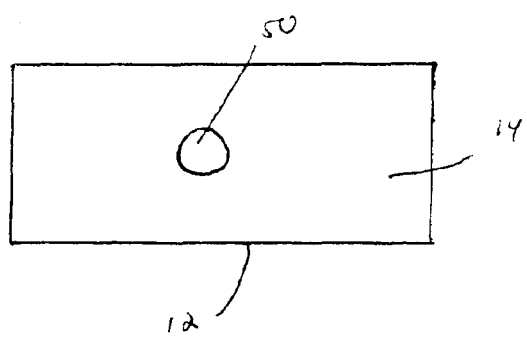
FIG. 22 is an end view of the wild game call of FIG. 21, illustrating the aperture in the sidewall of the box.

In other embodiments, as shown in FIG. 21 and FIG. 22, there may be an aperture 50 in the sidewall 14. In FIG. 21, there is a shown a box 10 having a closed base 12 and generally vertical sidewalls 14, an opening 16 in the sidewall, and a striking plate 18, comprising at least one friction surface, which serves as the top wall of the box. As show in FIG. 21, aperture 50 extends through the entire thickness of sidewall 14. The addition of aperture 50 reduces the echo produced by the wild game call of the present invention. Depending on the geometry of box 10 and plate 18, a reduction in the echo can make the sound produced by the call sound more realistic. FIG. 22, which is a side view at the end of the box away from the unsecured end of the plate, shows one possible position for the aperture 50 in the sidewall 14. Although aperture 50 in FIG. 21 and FIG. 22 is substantially circular, aperture 50 may be varied in geometry and size and there may be an aperture 50 in any of the embodiments of the wild game call set forth herein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A wild game call comprising:
a box having a base attached to substantially vertical sidewalls, the sidewalls forming an opening; and
a striking plate comprising at least one friction material and having a main body permanently attached to at least two sidewalls to form a top of the box, the at least one friction material being disposed on a top striking surface of the striking plate, the top striking surface being configured to be used with a striker, the main body being substantially coextensive with the sidewalls and comprising a protruding portion being disposed adjacent to the opening and being configured to extend over and beyond the opening.

2. The wild game call of claim 1, wherein the protruding portion comprises a bottom surface and wherein the bottom surface of the protruding portion is a bottom striking surface.

3. The wild game call of claim 1, wherein a thickness of the striking plate varies over a length of the plate.

4. The wild game call of claim 3, wherein a thickest portion of the striking plate is adjacent a sidewall opening.

5. The wild game call of claim 4, wherein a thickness of the protruding portion of the striking plate narrows gradually to form a thin unsecured end.

6. The wild game call of claim 2, wherein the striking plate comprises a plurality of friction materials.

7. The wild game call of claim 6, wherein the plurality of friction materials are arranged such that one friction material provides an entire top striking surface.

8. The wild game call of claim 6, wherein the plurality of friction materials are arranged such that each friction material provides at least a portion of the top striking surface.

9. The wild game call of claim 1, wherein the striking plate is further comprised of at least one hollow or semi-hollow structure which extends along at least a portion of a length of the striking plate.

10. The wild game call of claim 9, wherein the at least one structure comprises at least one groove in a bottom surface of the striking plate.

11. The wild game call of claim 10, wherein a shape of the at least one groove is selected from the group consisting of: rectangular, v-shaped, and rounded.

12. The wild game call of claim 9, wherein the at least one structure is comprised of at least one channel in the striking plate.

13. The wild game call of claim 12, wherein a shape of at least one channel is selected from the group consisting of: triangular prism, rectangular prism, and cylinder.

14. The wild game call of claim 9, wherein at least one channel is entirely enclosed within the striking plate.

15. The wild game call of claim 9, wherein at least one channel is comprised of at least one open end.

16. The wild game call of claim 6, wherein the plurality of friction materials are arranged such that one friction material provides the entire bottom striking surface.

17. The wild game call of claim 6, wherein the plurality of friction materials are disposed to form at least a portion of the bottom striking surface.

18. The wild game call of claim 1, wherein a sidewall comprises an aperture.

19. The wild game call of claim 1, wherein a material selected from the group consisting of galvanized steel, sand, weather resistant thermoplastic, and combinations thereof is embedded in the striking plate.

20. A wild game call comprising:
a box, the box comprising:
a base attached to substantially vertical sidewalls, the sidewalls forming an opening; and
a striking plate comprising a main body and a protruding portion, the main body being substantially coextensive with the sidewalls and having a top striking surface on a top exterior surface of the box comprising at least one friction material, the main body being permanently attached to at least two sidewalls, the top exterior surface being configured to be used with a striker, the protruding portion being disposed adjacent to the opening and being configured to extend over and beyond the opening.

* * * * *